C. C. VAN EVERY.
Corn Planter.
No. 8,459.
Patented Oct. 21, 1851.
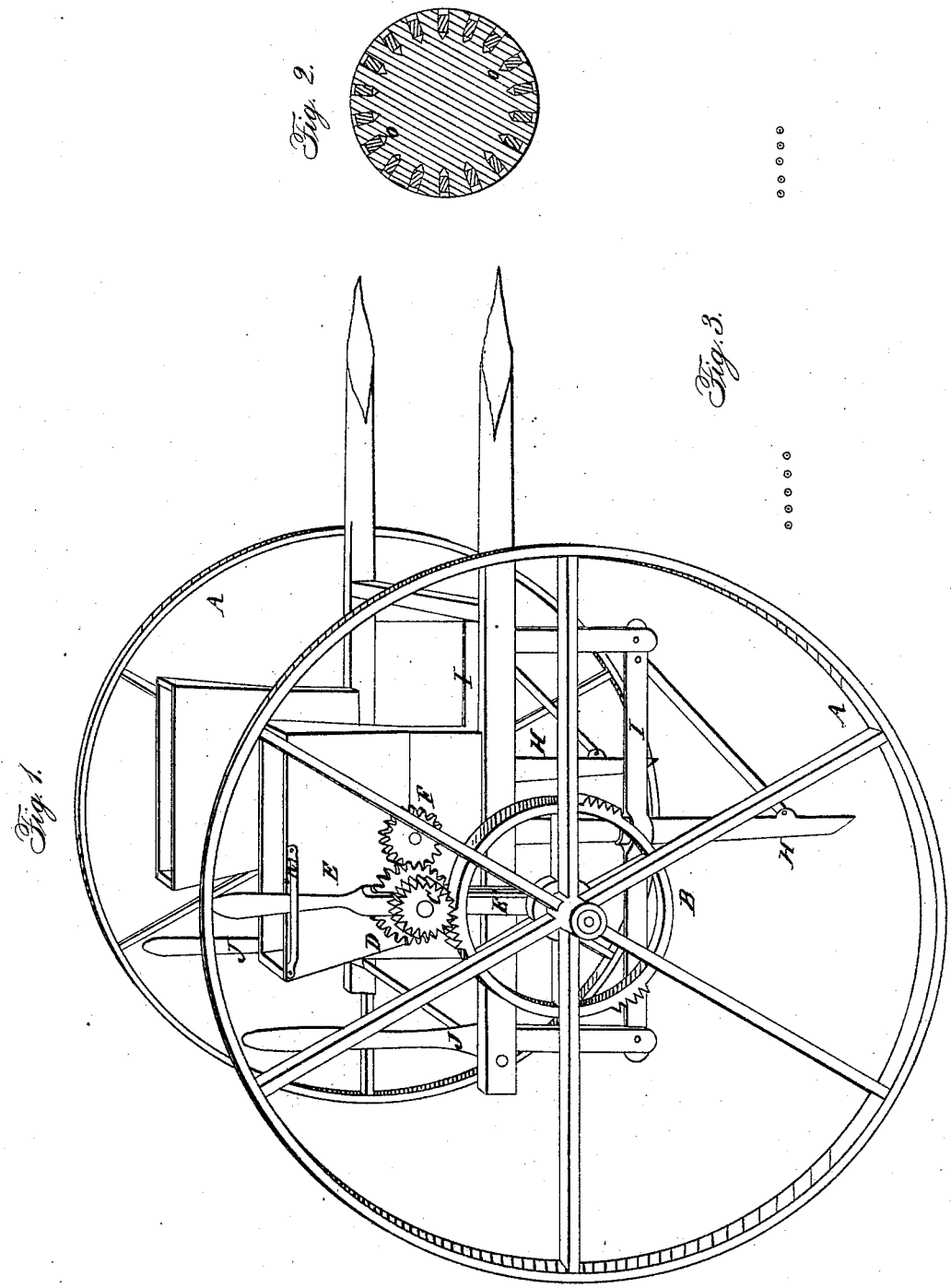

United States Patent Office.

CORNELIUS C. VAN EVERY, OF VICTOR, NEW YORK.

IMPROVEMENT IN THE SEEDING APPARATUS OF A SEED-PLANTER.

Specification forming part of Letters Patent No. 8,459, dated October 21, 1851.

*To all whom it may concern:*

Be it known that I, CORNELIUS C. VAN EVERY, of Victor, in the county of Ontario and State of New York, have invented a new and useful Improvement in Machines for Planting Corn, the construction and operation of which are described in the following specification and illustrated in the accompanying drawings with sufficient clearness and perspicuity to enable others of competent skill to make and use my invention.

The principal defect in all corn-planters with which I am acquainted is that they drop all the seed intended for a hill together, thus crowding the stalks into so small a compass as to seriously retard their growth and reduce the yield of grain, besides causing the stalks to grow in such positions as to render the removal of the weeds inconvenient.

My invention consists in obviating the above difficulties by a machine which plants the corn in the form shown in Fig. 3, thus leaving the blades or stalks about one and a half inch apart in the hill, and in line with each other, so as to afford the greatest facility for removing the weeds with the hoe.

Figure 1 is a perspective view of the machine. Fig. 2 is a vertical diametrical section of the cylinders which distribute the seed. Fig. 3 is a plan of the manner in which the seed is planted.

A A are the traction-wheels, which it is preferable to make of metal, though wooden wheels with metallic hubs will answer. These wheels are in this case supposed to be ten and one-half feet in circumference, so as to plant three hills three and one-half feet distant from each other at each revolution. A spur-wheel, B, is keyed or otherwise fastened upon the hub of the right-hand traction-wheel, and revolves with it. It is provided at intervals of one-third of the diameter of the wheel with teeth corresponding in number with the number of seeds to be deposited in each hill, each of which teeth occupies one-eighty-fourth part of the circumference of the wheel, so that one tooth passes at each one and one-half inch of progress.

The wheel B meshes into a pinion, C, one-fourth as large, and containing twenty-one teeth. On the same shaft with C is the wheel D, one-third larger, but containing the same number of teeth. The shaft of C and D is hung in a lever, E, which moves them concentrically with the wheel B, for the purpose of throwing the wheel D into and out of gear with the pinion F on the shaft of the seed-rollers, the lever E being held in its place by notches in the stay n. The pinion F contains eighteen teeth. The seed-rollers are ten inches in diameter, and each contains in its periphery eighteen recesses, each capable of containing one grain of corn, being adjusted by the screws o o to the precise depth required for that purpose.

The seed-boxes and brushes are constructed in the usual manner.

H H are tubes, through which the grain is conducted from the seed-rollers to the ground. They are constructed in the usual manner and hung in the bars I I, so as to be raised by the handles J J from the ground when the machine is not in use.

A machine constructed in this manner will plant corn or other grain in hills three and one-half feet apart and lay the seeds in each hill in line with each other about one and a half inch apart. These distances may, however, be varied by obvious changes in the machinery, as may be desired. Another wheel with cogs upon its entire periphery, put in the place of the wheel B, may be used to plant corn in drills or rows without intermission.

What I claim as my invention, which I desire secured to me by Letters Patent, is—

Giving the seed-rollers an intermittent rotary motion, substantially in the manner and for the purposes set forth.

CORNELIUS C. VAN EVERY.

Witnesses:
THOMAS P. HOW,
JOHN B. FAIRBANK.